US006259224B1

(12) United States Patent
Smith et al.

(10) Patent No.: US 6,259,224 B1
(45) Date of Patent: Jul. 10, 2001

(54) ELECTRONIC CANCELLATION OF DC MOTOR NOISE

(75) Inventors: Dexter Smith, Columbia; Joseph Schwartz, Ellicott City; Eldon W. Ziegler, Jr., Clarksville, all of MD (US)

(73) Assignee: Noise Cancellation Technologies, Inc., Linthicum, MD (US)

( * ) Notice: Subject to any disclaimer, the term of this patent is extended or adjusted under 35 U.S.C. 154(b) by 0 days.

(21) Appl. No.: 08/733,462

(22) Filed: Oct. 18, 1996

Related U.S. Application Data

(63) Continuation-in-part of application No. 08/302,744, filed on Sep. 9, 1994, now abandoned.

(51) Int. Cl.[7] .................................................... G05B 11/01

(52) U.S. Cl. .......................... 318/629; 318/611; 318/606; 318/599; 318/568.23; 318/460; 318/128; 388/814; 388/820

(58) Field of Search .................................... 318/629, 611, 318/606, 599, 568.23, 460, 128; 388/814, 820

(56) References Cited

U.S. PATENT DOCUMENTS

| | | | | |
|---|---|---|---|---|
| 5,568,557 | * | 10/1996 | Ross et al. | 318/629 X |
| 5,692,054 | * | 11/1997 | Parrella et al. | 381/71 |
| 5,809,843 | * | 9/1998 | Barger et al. | 364/572 |

* cited by examiner

*Primary Examiner*—Karen Masih

(57) ABSTRACT

An active attenuation system for a DC motor which yields global vibration reduction of slot or other motor induced tonals at the plate on which the motor is mounted without modifying the construction of the motor. The system comprises one or more vibration sensors, a signal synchronized to the slot rate or other motor induced tonal rate, an electronic adaptive controller and the means to supply the control signal into the motor field and/or armature current.

20 Claims, 2 Drawing Sheets

ELECTRONIC CANCELLATION OF DC MOTOR NOISE

This is a continuation-in-part of Ser. No. 08/302,744, filed Sep. 9, 1994.

BACKGROUND OF THE INVENTION

This invention relates to the active electronic cancellation of vibration emitted from operating D.C. motors, especially motor related tonal vibration. The use of active noise control in D.C. motors allows for savings in space and weight by replacement of selected conventional noise and vibration absorption methods with active control. Critical ways to eliminate this noise are by canceling the drive motor slot noise or other motor related tonals such as SCR vibration.

DC motors come in various configurations but a typical configuration is a separately excited, DC motor where three phase 60 Hz power from an AC source E such as a diesel motor generator is full wave rectified with six SCR's. per drive motor. The phase angle relative to line frequency during which the SCR's. turn on is varied to control the speed of the unit to be driven.

Tonal noise appears at frequencies related to the passage of armature slots within the motors or to harmonics of line frequency if an SCR drive is used. If multiple motors are run at different speeds then slot tones appear, one for each of the motor rates.

Noise Cancellation Technologies, Inc. (NCT) has devised controllers which, when coupled to the circuit described herein, can actively control the slot noise. NCT has developed several adaptive active cancellation controllers such as the NCT 2000 & 2010 both commercially available that have been used successfully to cancel periodic noise which arises, typically, from rotating machinery or repetitive sources. These controllers eliminate noise by adapting the coefficients of cosine and sine components of the frequencies to be canceled to produce an 180° C. out of phase signal to cancel the tonal noise. This results in very selective cancellation of the tonals related to the actual rate at which the equipment is operating. Adaptation to changes in the noise is very rapid. Also, the need for a reference signal of the actual noise from each source is eliminated and only synchronizing speed signals from the sources are needed. As the cancellation process is adaptive, it is not necessary to know the exact time delay and multipath structure between the device being quieted and the individual sensor elements. The algorithm will adapt in changes in phase and amplitude of the noise signal as long as the rate of change of the signal structure does not occur faster than the algorithm can adapt. An example of the fast adapting algorithm of NCT to variations in thee amplitude and phase of the noise is shown and described in U.S. Pat. No. 4,878,188 which is incorporated herein by reference. Adaption signal is controlled by a parameter that determines the bandwidth of the canceling signal. Increasing the speed of adaption increases the bandwidth of the canceling signal. Selection of the parameter value is dependent upon finding an optimum trade off between the need to track time varying propagation characteristics and the desire to minimize the bandwidth of the canceling signal.

This invention also makes use of the technique of using multiple sensors and actuators to generate the optimum control signal detailed in U.S. Pat. No. 5,091,953 "Repetitive Phenomena Cancellation Arrangement with Multiple Sensors and Actuators" which is hereby incorporated herein by reference. This technique can make use of multiple input signals and can generate multiple output signals that do not interfere with each other. That is, the controller will not try to cancel a signal from a actuator. It subtracts out these actuator signals from the control error minimization function by obtaining transfer functions between all sensors and actuators during calibration. Therefore, the algorithm knows what any particular actuator signal will look like at any sensor and subtracts it out of each sensor signal.

In the DC motor application, one or more accelerometers are used as the sensors and the field and/or armature currents are used as the extractors. During calibration, the transfer functions between field excitation and the sensors and between armature excitation and sensors are determined. Upon enabling the controller, the sensor signals are minimized at the frequencies of interest. Note that this algorithm is robust in that disconnecting one or more sensors and/or one actuator will not cause the system to become unstable; instead, the algorithm simples calculates new control signal (s) based on the remaining sensor information available to it.

In this invention, slot noise results as torque impulses are induced from the rotor to the stator of the drive motors as the armature rotates. These torque impulses are induced from the rotor to the stator of the drive motors as the armature rotates. These torque impulses are induced as slots on the armature pass by the motor stator poles. Use of helical slots reduces but does not eliminate the torque impulses.

Generally, the electrical power to the drive motor is modulated thus producing counter forces within the motor itself which act to counter the slot related impulses. To provide a feedback signal, transducers, such as accelerometers, which can sense slot rate vibration are mounted either on the motor or its mounting bracket/foundation to provide a feedback signal to the active cancellation controller.

OBJECTS OF THE INVENTION

Accordingly, it is an object of this invention to provide a method of canceling slot noise or other motor related harmonics in a DC motor.

Another object of this invention is to use an active noise controller to cancel slot noise or other motor related harmonics in a DC motor.

A further object of this invention is to provide a technology to quiet slot noise or other harmonics in a motor.

These and other objects of the invention will become apparent when reference is had to the accompanying description and drawings in which

SUMMARY OF THE INVENTION

Figure 1:
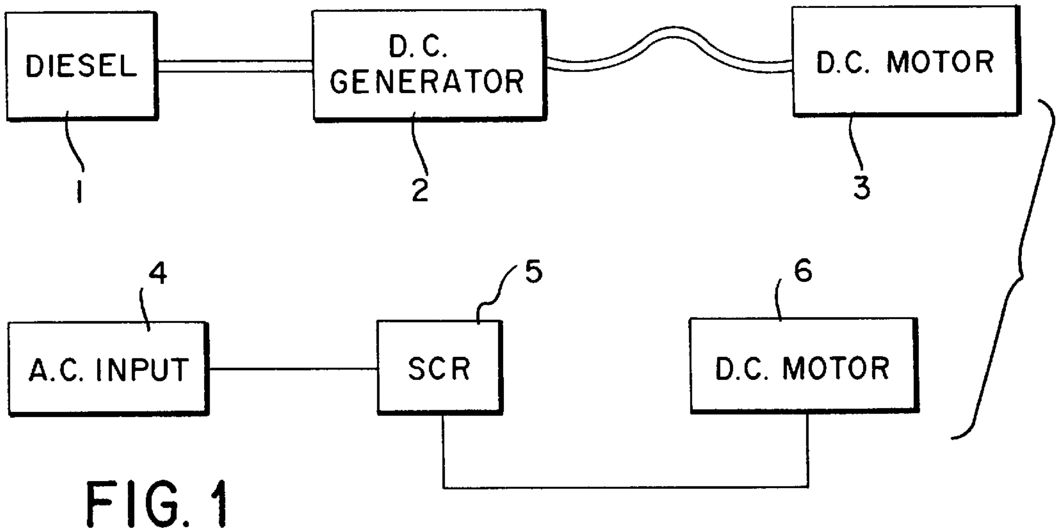
FIG. 1 shows a diagrammatic view of a typical DC motor/generator set and an alternative drive system.

The present invention is directed to a method of controlling slot vibration or other motor related tonal vibration in a direct current motor having field and armature windings. The invention comprises essentially the steps of passing a current through a winding of the DC motor, modulating the current in response to a control signal, sensing the vibration to provide a feedback signal and adjusting the control signal in response to the feedback signal by means of an adaptive control system to thereby reduce the tonal vibration.

The invention also comprises an active noise control system for controlling motor induced vibration in a direct current motor having field and armature windings. The system comprises frequency measuring means to detect the rotational speed of the motor and thus its slot rate, means to supply current to a winding of the motor, circuit means for modulating the current supplied to a winding of the motor at the slot rate thereof in response to a control signal, sensing means providing a feed back signal related to the vibration and controller means for adjusting said control signal in response to said feedback signal and the slot rate, whereby the tonal vibration is reduced.

DETAILED DESCRIPTION OF THE INVENTION

The current invention recognizes that some of the primary forces on a DC motor are due to torque fluctuations. By modulating the current these torque fluctuations can be reduced—thus there are no unsteady forces on the motor and therefore no need to apply counter forces. In a sense, the vibration is prevented from occurring or controlled rather than being canceled out.

In any rotating machine, either motor or generator, there is a stationary frame called the stator and a moving shaft called the rotor that revolves within the stator at some mechanical angular frequency. In a synchronous or non-synchronous AC machine the armature or "working coil" is on the stator whereas in a DC machine the armature coil is on the rotor. In motors, both stator and rotor have associated with them magnetic fields that interact to cause the rotor to turn under a load of some angular frequency.

Rotors are usually constructed of cylindrical, laminated steel with a number of slots or "teeth" evenly spaced that run the length of the rotor. Coils of insulated wire are wound about these slots. The magnetic force between the stator and rotor has a small variation superimposed on it at a frequency equaled to the number of rotor teeth passing by the stator poles per second. These alternating forces will cause vibration in the stator frame.

In constant speed machinery, the stiffness of the frame can be changed to destroy any particular resonance. However, in variable speed machines, other methods are necessary to cover the entire range of rotational speeds. In some motors where weight may be factor, the frames may be relatively lightweight which may exacerbate the problem.

Direct Current (DC) motors are used primarily where rotational speed will be varied under load such as in propulsion motors for locomotives or ships.

As stated above, a DC motor armature is on the rotor and on the stator consists of a fixed magnetic field. The stator field may be from fixed magnets or a set of windings in parallel or series to the armature windings. The speed of rotation of the armature is determined by the amount of current flowing in the armature coils. A commutator arrangement consisting of carbon brushes in contact with two or more copper segments from each slot winding reverses the plurality of the rotor field (or turns on the next slot winding in multiple slot armatures) to keep the torque unidirectional.

FIG. 1 shows a typical motor/generator set up with diesel 1 driving a DC generator 2 whose output, in turn drives a DC motor 3. This is typical of, for example, a diesel electric railroad engine arrangement where the DC motors are connected to the wheels. An alternative to this is to provide an AC input as at 4 to an SCR at 5 which conducts on at different points in the ACC cycle based on inputs at the gate. The current to DC motor 6 has harmonic based on the off and on of the SCR.

The brushes can spark at the commutator due to the current in one slot not decaying to zero before the next slot is turned on. The balance of the current then jumps to zero as a spark. In larger DC motors, interpoles consisting of small windings in series with the armature are added between the poles. The polarity of the interpoles is such that they are always the same as the pole behind them from the point of view of rotation of the armature.

Figure 5:
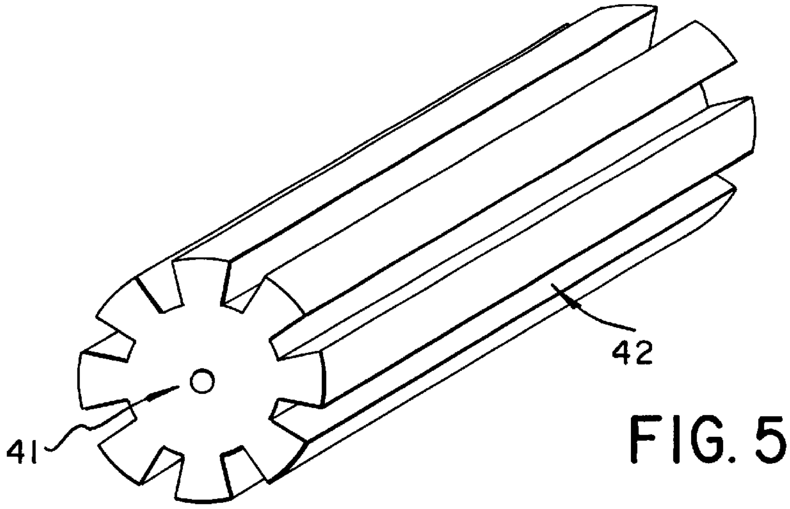
FIG. 5 shows a typical armature having longitudinal straight slots.
Figure 6:
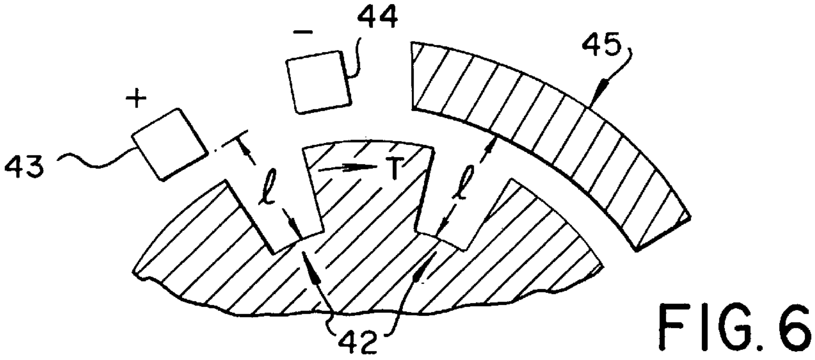
FIG. 6 shows a partial diagrammatic view of the interrelationship of the armature slot and the motor field poles.

Referring to FIGS. 5 and 6 there is shown an armature 41 having longitudinal slots as at 42 which are not skewed but straight in this configuration. In FIG. 6 there are shown slots as at 42 with an air gap between the bottom of the slot and brushes as at 43, 44 and stator 45. The rotational speed is determined by the amount of current in the armature coils and field excitation. The physical force between armature 41 and field poler 45 changes due to the changing of the length (l) of the air gap which pushes on the massive poles and is translated to the relatively thin frame mounts of the motor causing it to vibrate. The reluctance (R) of the air gap is directly proportional to the length (l) of the air gap. T is the constant torque which is dependent on the magnetic in the air gap flux. The magnetic field between the armature and slots changes thereby causing an additional sinusoidal torque T component at the slot frequency. The slot vibration, which can be measured with an accelerometer, is as follows SLOT VIBRATION=rpm/60×No. of slots Control of DC motors can be with direct DC waveforms or with SCR type switching waveforms. Older systems, called Ward-Leonard systems, consisting of diesel engines connected to DC generators which in turn were connected to the DC motor. For smaller, motors, it is also possible to drive them directly with solid state power transistors from a variable DC power supply.

Modern solid state control of DC motors is with SCR controllers. The SCR is a device that delivers a RMS DC output from an AC input. The device turns on at different points in the AC cycle based on inputs to its gate. Note that this sudden turning on and off generates harmonics in the current drive to the motor and can excite vibration in the motor that can be transmitted through the mount to the surrounding structure.

Figure 2:
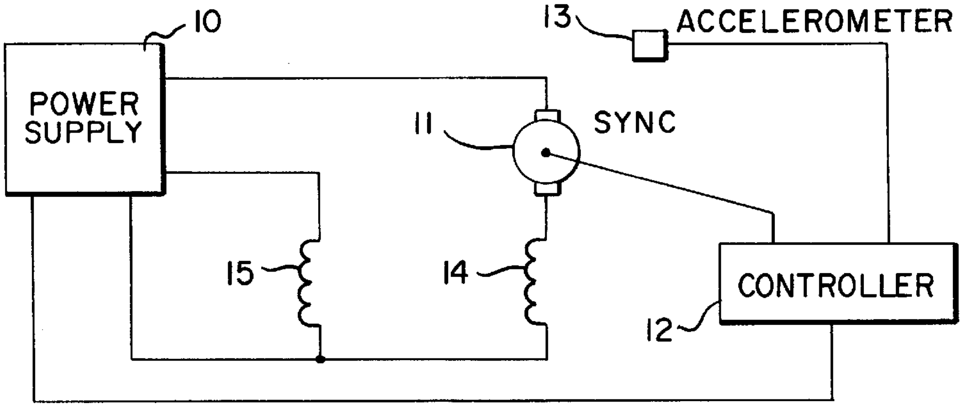
FIG. 2 shows a typical circuit arrangement for typing an active noise controller into a slot noise cancellation circuit.

FIG. 2 shows a typical circuit arrangement for controlling slot noise in a DC motor with power supply 10, DC motor 11, field winding 15, armature winding 14, controller 12 and accelerator 13 and synch to determine fundamental noise value.

Many years ago it was determined that if the number of rotor teeth divided by the number of poles was an integer, a compressed and extended mode of vibration was excited. If there were n+½ teeth per pole, other modes were excited. The solution was to skew the slots either by one full tooth pitch over the length of the rotor or over half the length of the armature (herringbone pattern). The idea is that pull between pole and rotor over half the armature is compensated by push over the other half. The practical drawback is the cost of these complicated rotor designs. In addition, straight skewing the slots does not reduce the slot noise significantly in many motors.

Slot noise appears to be caused by the rotor slots passing beneath the lip of the field poles. The force acting on a pole is proportional to the air gap magnetic flux density squared, B^2. B varies as the slots pass underneath the polers. B is the flux/area where flux is the magnemotive force (mmf)/air gap reluctance Ra. Ra is proportional to the length of the air gap. So as the slots pass the pole, the air gap length changes which changes the reluctance. This changing reluctance is what causes the flux and therefore B to change at the slot passage frequency.

| | |
|---|---|
| B | flux density |
| u | permeability of material |
| H | magnetizing force |
| phi | force |
| A | cross sectional area |
| u0 | 4 pi × 10 ^ − 7 |
| F | mmf |
| I | current |
| N | number of turns on core |
| R | reluctance |
| l | length of core |

B = uH
F = NI
H = F/l
B = flux/A
flux = F/R
R = l/(uA)

air gap force=B^2 A(2u0)=F^2u^2/(l^2u0)

The problem of slot and SCR vibration was attacked successfully with NCT technology. The cause and nature of the vibration is cyclical which has been reduced in a variety of systems. Without modifying the motor, there are two places to add in the canceling signal—the field coil and the armature coil.

Figure 3:
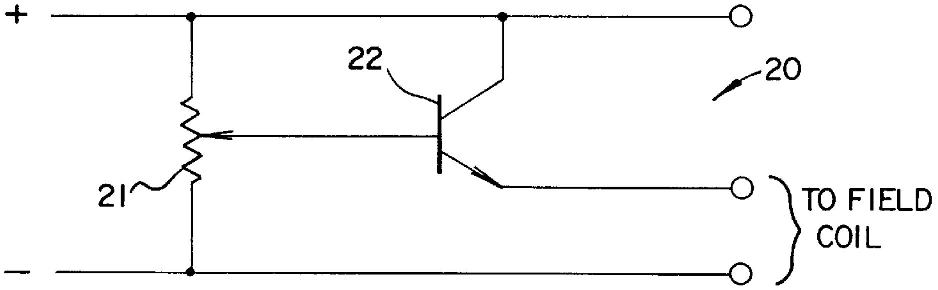
FIG. 3 shows the specific circuit for a field circuit connected slot noise quieting arrangement.
Figure 4:
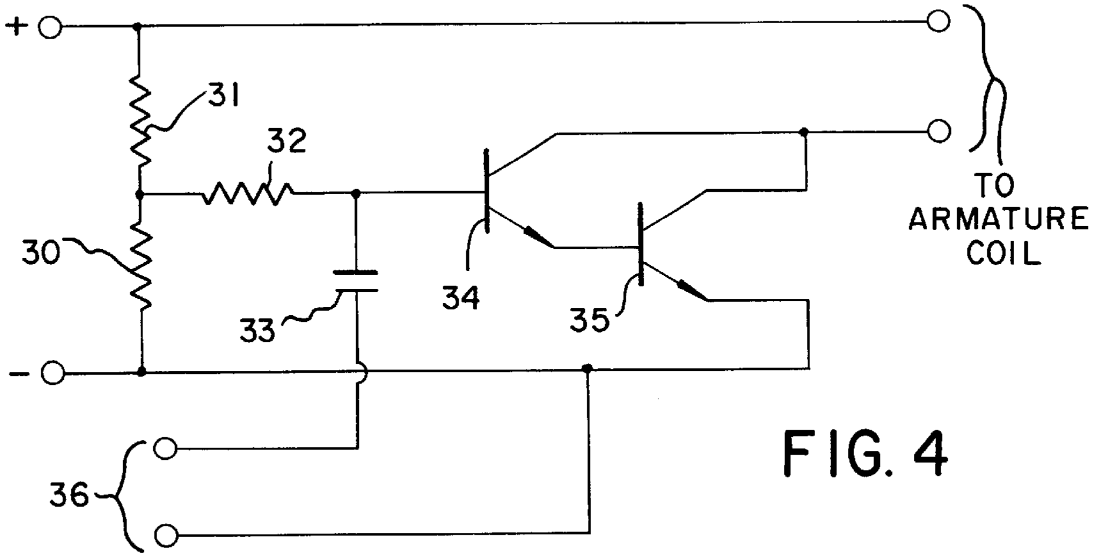
FIG. 4 shows the specific circuit for an armature circuit connected slot noise quieting arrangement.

FIG. 3 shows a typical circuit 20 for a field coil connection with variable resistance 21 and transistor 22 such as a 2n3773 connected to produce an output at the field coil. an NCT controller is capacitively coupled on top of the bias 23. Current is supplied through the field at the slot rate. FIG. 4 shows the circuitry 30 for the armature coil connection with resistances 31, 32, capacitor 33 and transistors 34, 35 (such as 2N3773) and connection 36 to the controller. The controller can be manual using an HP3314A Function Generator or equivalent to produce the correctly phased cancellation signal relative to the synch signal. The output is adjusted to cause the residual vibration signal to go to zero.

The controller can also be automatic, closed loop, interacting control. Here the residual(s) are controlled, via mathematical algorithms, to 0 continuously. The control will track as RPM changes and one channel will cancel only the residual vibration but not another channels cancellation signal.

The sync used can be an optical sensor or magnetic pickup and the DC voltage used can be variable.

The motor used for demonstration was a lhp, separately excited DC motor. It has 19 slots which are skewed but still produce a significant slot vibration.

The slot frequency can be observed by optically in coding the shaft with the same number of slots or by placing it on a magnetic pick up coil at the edge of the field hole. This forms the synch signal. The residual signal is obtained from an accelerometer placed on the motor case or on the base plate. The control signal is synchronized to the synch signal and varies its output waveform, phase and amplitude to minimize the residual signal.

The field coil is attractive from an implementation because it is an order of magnitude less power compared to the armature coil and it's construction and function is simple.

A successful demonstration of the technology was made using the armature coil. The vibration at the motor base plate was reduced 12 db on the average on one side at a time using manual adaptive control. The phase, amplitude, and symmetry of a sinusoidal output to the armature coil was provided to produce the reduction in vibration. The solution tracked in frequency as the shaft speed was varied up and down from the nominal. Applying control produced no change in speed and therefore no change in torque.

A successful demonstration of using the field coil was made. The field control circuit was identical to the armature circuit shown previously only with two, not four final power transistors. The field control showed a decrease of 3–5 db globally on the motor base plate (not only one side as in the armature control experiment). With control amplitude relatively small, no change in speed and therefore torque was observed.

Both field and armature circuits were successfully controlled simultaneously with NCT 2010 2 channel technology to reduce slot induced vibration 20 db globally on the base plate of a DC motor. The present solution used circuits in series with the coil but parallel circuits can be used.

The forgoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A method of controlling slot vibration or other motor related tonal vibration in a direct current motor having field and armature windings comprising the steps of (a) passing a current through a winding of said motor, (b) modulating said current in response to a control signal, (c) sensing said tonal vibration to provide a feedback signal, and (d) adjusting said control signal in response to said feedback signal by means of an adaptive control system, thereby reducing said tonal vibration.

2. A method as in claim 1 wherein said current is passed through the field winding of said motor and is a direct current.

3. A method as in claim 1 wherein said current is passed through the armature winding of said motor.

4. An active noise control system for controlling motor induced vibration in a direct current motor having field and armature windings, said system comprising (a) frequency measuring means to detect the rotational speed of the motor and thus its slot rate, (b) means to supply current to a winding of said motor, (c) circuit means for modulating the current supplied to a winding of said motor at the slot rate thereof in response to a control signal, (d) sensing means providing a feed back signal related to said vibration, and (e) controller means for adjusting said control signal in response to said feedback signal and said slot rate, whereby said tonal vibration is reduced.

5. A system as in claim 4 wherein the control circuit is connected in series with a coil of said motor.

6. A system as in claim 4 wherein the control circuit is connected in parallel with a coil of said motor.

7. A system as in claim 4 wherein the control is a manual control operating loop on the armature.

8. A system as in claim 4 wherein the control is an automatic controller operating closed loop on the armature.

9. A system as in claim 4 whereby vibration reduction is point reduction on the motor or motor mounting plate.

10. A system as in claim 4 wherein the tonals are multiples of line frequency and said frequency measuring is off the line supplying the motor.

11. A system as in claim 4 wherein the current is supplied to the field winding of said DC motor.

12. A system as in claim 4 wherein the current is supplied to the armature winding of said DC motor.

13. A system as in claim 4 wherein said sensing means is an optical scanner.

14. A system as in claim 4 wherein said sensing means is a magnetic pickup.

15. A system as in claim 4 wherein said circuit means includes an SCR controller which delivers a direct current RMS output from an alternating current source.

16. A system as in claim 4 wherein the control is a manual controller operating open loop on the field.

17. A system as in claim 4 wherein the control is an automatic controller operating closed loop on the field.

18. A system as in claim 4 wherein the control is an automatic controller operating closed loop on the field and armature and is interacting in that only the tonal vibration is canceled not the control signal.

19. A system as in claim 4 whereby vibration reduction is global reduction on the motor or motor mounting plate.

20. An active noise cancellation system for controlling the motor induced vibration in a DC motor having field and armature windings a slot rate, said system comprising a sensing means to detect motor related tonals, means to supply current through a winding of said DC motor at the slot rate thereof, circuit means for producing anti-noise signals to be applied to the field and/or armature windings to counter the slot tonals vibration and thereby lessen the slot induced vibration of said motor.

* * * * *